March 15, 1960 R. RABIN 2,929,047

RADAR TARGET CLASSIFICATION SYSTEM

Filed Dec. 31, 1956 2 Sheets-Sheet 1

March 15, 1960 R. RABIN 2,929,047

RADAR TARGET CLASSIFICATION SYSTEM

Filed Dec. 31, 1956 2 Sheets-Sheet 2

INVENTOR
RICHARD RABIN.
BY Victor D. Borst
ATTORNEY

United States Patent Office 2,929,047

Patented Mar. 15, 1960

2,929,047

RADAR TARGET CLASSIFICATION SYSTEM

Richard Rabin, Stamford, Conn., assignor to Sperry Rand Corporation, Ford Instrument Company Division, Long Island City, N.Y., a corporation of Delaware Application December 31, 1956, Serial No. 631,898

6 Claims. (Cl. 340—149)

This invention is related to radar target classification systems and particularly to a high speed automatic device for processing unknown target input data, comparing this data with catalogued data for many classified targets, identifying the closest corresponding catalog data and finally indicating the probability or the figure of merit for the accuracy of the matching data.

The conventional procedure for target classification from data provided by airborne radar, computer and navigational systems is accomplished in the manner hereinafter described. The depression angles at which the unclassified target changes standard contrast levels are computed and provided as input data for classification. From the keys for each target classification are read the percentage of change points at the particular depression angles for the contrast change from black which has a standard rating of 4 to dark grey which has a standard rating of 3, from dark gray to light gray, the latter having a standard rating of 2, and from light gray to white, the latter having a standard rating of 1. The individual percentages for each target classification are multiplied and the products compared. The highest percentage indicates the most probable classification for the unknown target and the value of the highest percentage is the "target estimate parameter" or relative figure of merit for the classification.

The invention contemplates a classification and identification device for performing automatically and rapidly the procedural steps suggested by the hereinbefore detailed description. In general, potentiometer means are connected to receive the known depression angle information for the 4–3, 4–2 and 2–1 contrast level changes of the unclassified target, the potentiometer means providing representative voltages which are directly proportional to the degree of match between the input data and known catalogued data for a large number of known target classifications. The representative voltages are generated for each contrast level change in comparison with known data for each catalogued classification and the target estimate parameter is available as a voltage equal to the product of the three voltages corresponding to the three change points. A sensing circuit then detects the highest product and actuates an indicator unit which displays both the probable target classification and the highest figure of merit.

Figure 1:
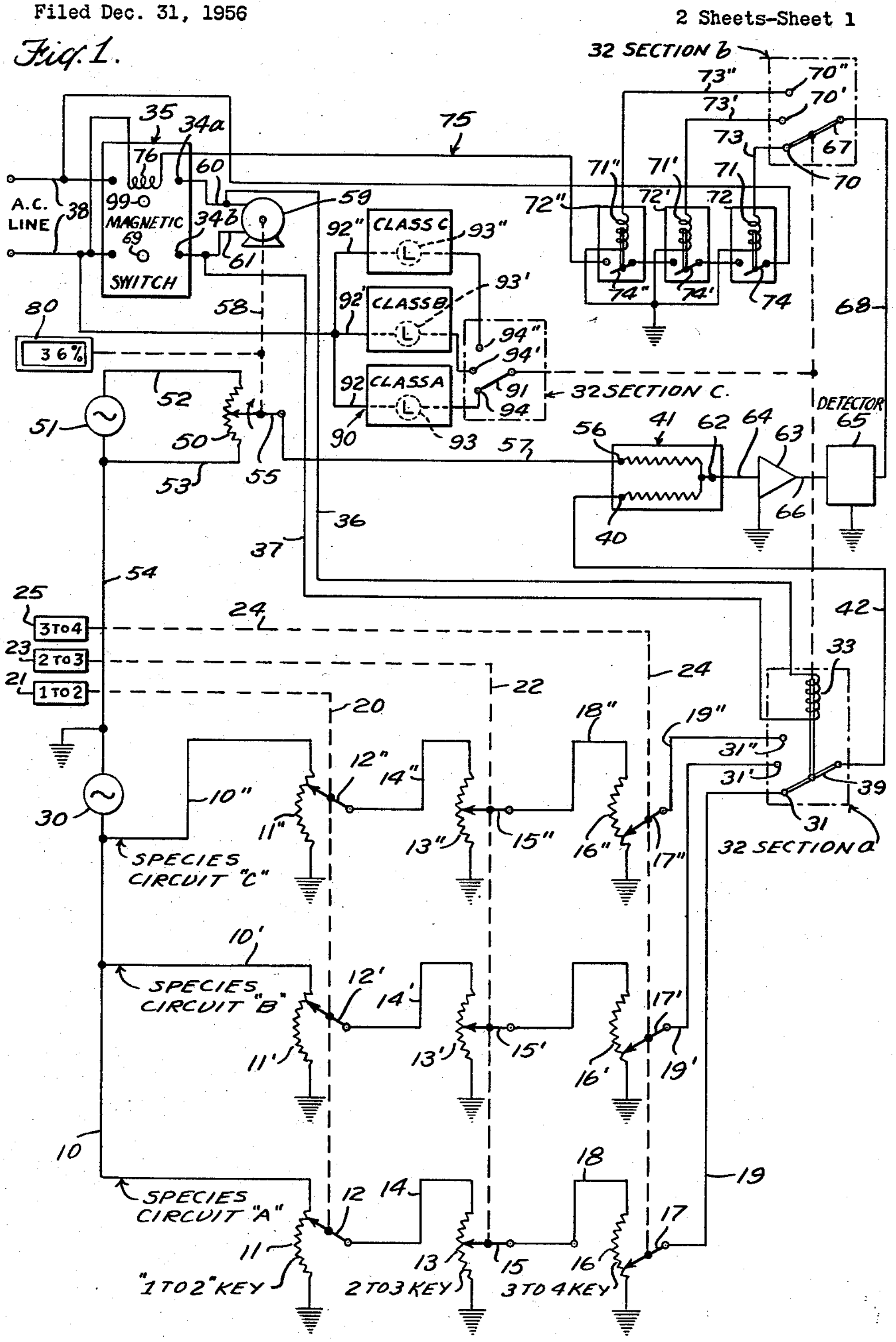
Figure 2:
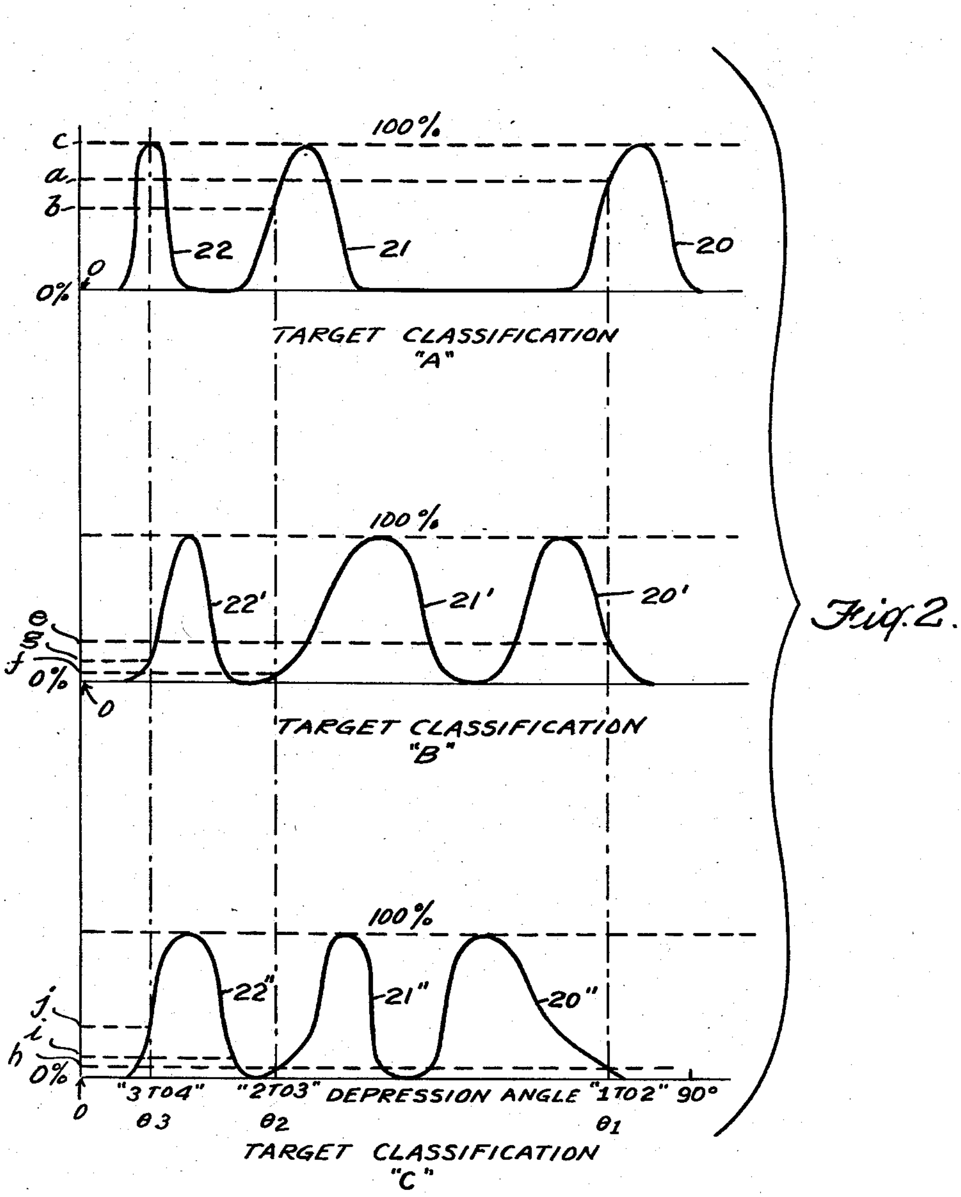

The features of the invention will be understood more clearly from the following detailed description taken in conjunction with the accompanying drawings in which:

Fig. 1 is a schematic diagram of an automatic classification system which yields a relative figure of merit for the probable accuracy of the resulting classification; and Fig. 2 is a diagram illustrating the catalogued classifications of known targets as resistance distributions in potentiometers for generating key voltages from depression angle data of an unknown target.

While it is intended that the invention may be embodied in a device for processing any number of target classifications and any number of known depression angle change points, the disclosure in Fig. 1 is made for explanatory purposes by describing an embodiment for three known target classifications "A," "B" and "C" with known input data for the "1 to 2," the "2 to 3" and the "3 to 4" change points.

Referring to the schematic drawing of Fig. 1, a series species circuit "A" for a known target classification "A" comprises a conductor 10 connected to one input side of a "1 to 2" key potentiometer 11 having its slider 12 connected to one input side of a "2 to 3" key potentiometer 13 by a conductor 14, the slider 15 of the potentiometer 13 being connected by a conductor 18 to one input side of a "3 to 4" key potentiometer 16 having a slider 17, and a conductor 19 connected to the slider 17. The potentiometers 11, 13 and 16 each represent the key for one change point of one target classification by having its resistance distribution directly proportional to the probability of occurrence curve expressed as a percentage for that key as related to the angular displacement of the change points. In Fig. 2 is shown a diagram of the resistance distribution in relation to its shaft displacement for the potentiometer 11 by curve 20, for the potentiometer 13 by the curve 21 and for the potentiometer 16 by the curve 22. The curves 20, 21 and 22 represent the known probability of the location of the "1 to 2," "2 to 3" and "3 to 4"' change points for one known target classification.

The circuitry for species circuit "B" corresponding to known target classification "B" and for species circuit "C" corresponding to know target classification "C" is similar to the described circuitry for species circuit "A." For simplification of this explanation, the corresponding components in the species circuit "B" will bear the same number as that in the species "A" circuit with a prime (') suffix and the species "C" will bear the same number with a double prime (") suffix. However the resistance distribution of the potentiometers in species circuits "B" and "C" will correspond to the known data for those target classifications as illustrated in Fig. 2.

The potentiometers 11, 11' and 11" and their sliders 12, 12' and 12" are ganged together by a shaft 20 which is connected to a driving device 21, this driving device displacing the shaft 20 in direct proportion to known input data for the depression angle of an unknown target for the "1 to 2" change point. Similarly, the potentiometers 13, 13' and 13" and their sliders 15, 15' and 15" are ganged together by a shaft 22 which is connected to a driving device 23, this driving device displacing the shaft 22 in direct proportion to known input data for the depression angle of an unknown target for the "2 to 3" change point. Also the potentiometers 16, 16' and 16" and their sliders 17, 17' and 17" are ganged together by a shaft 24 which is connected to a driving device 25, this driving device displacing the shaft 24 in direct proportion to known input data for the depression angle of an unknown target for the "3 to 4" change points. As a practical expedient, the required resistance distributions of the potentiometers can be economically approximated by employing 60 quantized depression angle values and replacing each potentiometer with a 60 discrete position selector switch having fixed resistors of selected values connected between the 60 stator points.

Conductors 10, 10' and 10" of series species circuits "A," "B" and "C" are joined and connected to one side of an A.C. reference voltage source 30, the other side of this reference voltage source and the other input terminals of all the potentiometers being connected to a common ground so as to complete the electrical circuits. When the input shafts 20, 22 and 24 are displaced to correspond to known depression angle change points, the potential of conductors 19, 19' and 19" will have different values when the potentiometers are selected for the three different target classifications "A," "B" and "C." The conductor which is related to the target classification having the closest match with the input data will have the highest voltage. In Fig. 2, the unknown target has a "1 to 2" change point at $\theta_1$ degrees, a "2 to 3" change point at $\theta_2$ degrees and a "3 to 4" change point at $\theta_3$ degrees. The voltage of conductor 19 in species circuit "A" will have a value equal to the product $(Oa) \times (Ob) \times (Oc)$, the voltage of conductor 19' in species circuit "B" will have a value equal to the product $(Oe) \times (Of) \times (Og)$ and the voltage of conductor 19'' in species circuit "C" will have a value equal to the product $(Oh) \times (Oi) \times (Oj)$. For the circuit values as represented in Fig. 2, it is apparent that the unknown target most closely resembles target classification "A" and the voltage of conductor 19 will be higher than the potentials of conductors 19' and 19''.

Conductors 19, 19' and 19'' are connected to terminals 31, 31' and 31'' respectively of section *a* of a three section ganged stepper switch 32 having a solenoid actuating coil 33, the solenoid coil being connected across the output terminals **34*a* and 34*b* of a magnetic starting switch 35 by conductors 36 and 37 and the switch 35 being connected across an A.C. line 38. The rotating arm 39 of the stepping switch 32** section *a* is connected to one input terminal 40 of an additive network 41 by a conductor 42.

A negative reference potentiometer 50 is connected across another A.C. reference source 51 by conductors 52 and 53. The voltage sources 51 and 30 yield equal magnitudes of voltages and are interconnected by a conductor 54 so as to maintain a relative phase displacement of 180 degrees between the other terminals of the two sources. Slider 55 of potentiometer 50 is connected to the other input terminal 56 of the additive network 41 by a conductor 57 and the shaft 58 of the potentiometer 50 is driven by a motor 59, the motor 59 being connected across the output terminals **34*a* and 34*b* of the magnetic switch 35 by conductors 60 and 61. A revolution counter 80 is connected to the shaft 58** for indicating the "target estimate parameter."

The output terminal 62 of the additive network 41 is connected to the input side of an amplifier 63 by a conductor 64 and the output side of this amplifier is connected to a phase detector 65 by a conductor 66, the common input and output terminals of the amplifier and phase detector being connected to ground.

When the start button 69 of the magnetic switch 35 is depressed, the motor 59 drives the arm 55 of the potentiometer 50 upward and the stepper switch 32 section *a* is indexed in a repetitive manner by its energized solenoid coil 33, the selective rate of movement of the slider of the negative reference potentiometer being relatively less than the rate of indexing of the stepper switch. The increasing voltage output of the negative reference potentiometer 50 bucks the voltage output of the keys in the additive network 41 as the stepper switch section *a* rapidly samples the positive key voltages corresponding to the various target classifications. The amplifier 63 amplifies these difference voltages and the phase sensitive detector 65 converts this A.C. voltage to a D.C. voltage with a polarity which is dependent on the phase of its input signal. The output side of the phase sensitive detector 65 is connected to the rotating arm 67 of section *b* of the ganged stepper switch 32 by a conductor 68. Stator contacts 70, 70' and 70'' of section *b* of the ganged stepper switch 32 are connected to one terminal of solenoid coils 71, 71' and 71'' of polarized relays 72, 72' and 72'' by conductors 73, 73' and 73'', respectively, the polarized relays being of the "normally open" type which latch in their closed position. These relays are connected to require a negative voltage on contacts 70, 70' and 70'' for actuation. The other terminals of the solenoid coils 71, 71' and 71'' are connected to a common ground in order to complete the electrical circuits. As the key voltages corresponding to the known target classifications are sampled by the stepper switch, the polarized relays remain dormant until the negative reference voltage from potentiometer 50 exceeds one of the key voltages. The contacts 74, 74' and 74'' of the polarized relays 72, 72' and 72'' are connected in a series tripping circuit 75 which includes a tripping solenoid coil 76 in the magnetic switch 35, the tripping circuit being connected across the A.C. line 38 for energization. As the negative reference voltage slowly increases on potentiometer 50, it will exceed first one of the positive key voltages, say the voltage output of species circuit B so as to close contact 74'; then it will exceed another key voltage, say the voltage output of species circuit C so as to close contact 74''. Finally, because the voltage output of the species circuit A has the highest positive key voltage under the assumed conditions, the polarized relay 72 will actuate on the closing of the contact 74 as the negative reference voltage crosses over the level of the highest of the three key voltages. For the assumed conditions of this explanation, the output voltage of the species circuit "A" has the highest positive key voltage. When conductor 68 becomes negative for the three successive steps of the stepper switch, contacts 74, 74' and 74'' will all be closed and the motor 59 will be stopped by the tripping of the magnetic switch 35. The counter 80 being mechanically related to the position of the moving slider of the negative reference potentiometer will indicate a number which can be calibrated to read "target estimate parameter" or a figure of merit to display the degree of match between the unknown classification and the closest catalogued classification.

A classification display circuit 90 connected to the A.C. line 38 comprises a rotating arm 91 of section *c* of ganged stepper switch 32 and three branch circuits 92, 92' and 92''. Branch circuit 92 comprises a series circuit of a lamp 93 behind a transparency labeled "Class A" and a stator contact 94 of section *c* stepper switch 32. Branches 92' and 92'' include lamps 93' and 93'' and stator contacts 94' and 94'', respectively. The tripping of the magnetic switch 35 by the polarized relay 72 will deenergize the stepper switch 32 at the contact position of the highest key voltage and the rotating arm 91 will maintain contact with stator contact 94 to display "Class A" as a lighted sign.

The device is made ready for another classification by depressing the reset button 99 which returns the rotating arm 55 of the negative reference potentiometer 50 to its zero starting position.

It is to be understood that various modifications other than those described may be effected by persons skilled in the art without departing from the principle and scope of the invention as defined in the appended claims.

What is claimed is:

1. An automatic comparator comprising a plurality of potentiometers, the said potentiometers being arranged in ganged groups, means for independently setting each of said potentiometer groups in accordance with known data, a plurality of species circuits, each species circuit having in series connection one potentiometer in each of the ganged potentiometer groups, each potentiometer in each of said series species circuits having a resistance distribution representing a known response of a known species classification, an A.C. reference voltage source, one end of each of the said series species circuits being connected to the said A.C. reference voltage source, and voltage comparison means having a reference voltage source and being selectively connected to the other end of the species circuits for consecutively comparing the voltage outputs thereof with the reference voltage, whereby an indication may be automatically afforded of the unknown classification species on comparison of said reference voltage with the voltage outputs of said species circuits.

2. An automatic comparator as claimed in claim 1 wherein said voltage comparison means includes an A.C. line, a magnetic switch connected across said A.C. line, a motor and a stepper switch connected across said magnetic switch, said reference voltage source being A.C. variable and being connected to the first mentioned A.C. reference source in 180° phase relationship thereto and in controlled connection with said motor, an adding network connected to said stepper switch and to said variable A.C. reference voltage source and tripping means connected to said magnetic switch and said adding network for opening said magnetic switch when the stepper switch contacts the species circuit having the highest potential and such highest potential is slightly exceeded by the oppositely phased voltage of said variable reference source.

3. An automatic comparator as claimed in claim 2 wherein the said tripping means includes a phase detector connected to said adding network, a second stepper switch ganged to the first mentioned stepper switch and connected to the said phase detector, a plurality of polarized relays, each polarized relay being selectively connected across one output of the said second stepper switch, said polarized relays being connected to said magnetic switch whereby said magnetic switch is adapted to be tripped when all the said polarized relays have been actuated.

4. An automatic comparator as claimed in claim 3 wherein a counter is operatively driven by said motor, said counter being adapted to indicate the figure of merit for the degree of match.

5. An automatic comparator as claimed in claim 3 wherein there is provided target classification means connected to one of said stepper switches.

6. An automatic comparator as claimed in claim 5 wherein said target classification means includes a third stepper switch mechanically ganged with one of the other stepper switches and a plurality of lamps selectively connected across said A.C. line through said third stepper switch.

References Cited in the file of this patent

UNITED STATES PATENTS 2,500,997 Morgan ---------------- Mar. 21, 1950